United States Patent [19]

Rupp et al.

[11] 3,723,604

[45] Mar. 27, 1973

[54] PROCESS FOR REMOVING THIOUREA AS AN IMPURITY FROM ALKALI-AND ALKALINE EARTH-METAL RHODANIDES

[75] Inventors: Hans-Dieter Rupp, Erlenbach/Main; Helmut Magerlein, Obernburg/Main, both of Germany

[73] Assignee: Glanzstaff A.G., Wuppertal, Germany

[22] Filed: Mar. 3, 1971

[21] Appl. No.: 120,702

[30] Foreign Application Priority Data

Mar. 5, 1970   Germany.....................P 20 10 278.7

[52] U.S. Cl. ................................423/366, 260/55 R
[51] Int. Cl. .........................C01c 3/20, C07c 127/00
[58] Field of Search ...23/75, 135; 260/552 R, 555 R; 423/366

[56] References Cited

UNITED STATES PATENTS 2,164,141   6/1939   Moore....................................23/135

OTHER PUBLICATIONS

Richter, Organic Chemistry, Vol. 1, 3rd Ed. (1944), p. 509.

E. Schmidt, Entschurefelung des Thicharnstoffer, Archiv Der Pharmazie, Vol. 255 (1917), pp. 338–351.

*Primary Examiner*—Oscar R. Vertiz
*Assistant Examiner*—Hoke S. Miller
*Attorney*—Johnston, Root, O'Keeffe, Keil, Thompson & Shurtleff

[57] ABSTRACT

Process for removing thiourea as an impurity from a crude alkali- or alkaline earth- metal rhodanide wherein an aqueous solution of the impure or crude rhodanide containing the thiourea is heated at certain elevated temperatures and in the presence of copper (II) oxide, preferably with an excess of the oxide with reference to a stoichiometric molar amount of the thiourea. Very pure rhodanides substantially free of thiourea are known to be useful in the manufacture of thiocyanates, especially organic thiocyanates, among other uses.

10 Claims, No Drawings

PROCESS FOR REMOVING THIOUREA AS AN IMPURITY FROM ALKALI-AND ALKALINE EARTH-METAL RHODANIDES

Ammonium rhodanide, which has been produced by the reaction of ammonia and carbon disulfide or from hydrocyanic acid, is always contaminated with thiourea. When re-salting the ammonium rhodanide into alkali or alkaline earth metal rhodanide, the thiourea is again found as an impurity in the rhodanide solution or in the solid alkali or alkaline earth metal rhodanide after evaporation and crystallization from the solution. For example, a technical sodium rhodanide may contain about 0.2% by weight of thiourea. Since it is quite common for technical reasons to obtain a very pure rhodanide, especially in the production of sodium rhodanide and with particular regard to sulfur-containing impurities, it is considered essential to separate or remove the thiourea.

According to one known process, a sodium rhodanide solution containing thiourea as an impurity is reacted with hydrogen peroxide. In this case the thiourea reacts to form urea and sulfuric acid, this latter compound after neutralization with a caustic soda solution being precipitated and isolated by addition of barium rhodanide to form an easily filterable barium sulfate.

In this known process, it is unconditionally necessary to add hydrogen peroxide in amounts which are equivalent to the thiourea content. If one uses an excess of the hydrogen peroxide, a corresponding amount of the rhodanide is oxidized so that the resulting decomposition products represent undesirable impurities just as much as thiourea. Thus, the thiourea content must be analytically determined in this process before carrying out the purification.

Furthermore, it is absolutely essential in this known process to proceed during the technical production of the alkali or alkaline earth metal rhodanide by first cooling the hot aqueous solution down to about 30° to 40° C., in order to prevent the thermal decomposition of the hydrogen peroxide and also to prevent the simultaneously occurring oxidation of the rhodanide at higher temperatures. In order to achieve a quantitative precipitation of the sulfate, one must again heat the reaction solution after the desired reaction back up to a temperature of about 100° C. Thus, this process is accompanied by extremely high energy requirements.

All previously known processes for the purification of rhodanides, i.e., removal of thiourea from the alkali or alkaline earth metal rhodanides, are accompanied by a number of serious disadvantages. It is either difficult to obtain a complete reaction or else the reaction is apt to proceed in such a manner as to cause undesirable decomposition reactions or present excessive energy requirements.

One object of the present invention is to provide a process for effectively removing thiourea from a crude alkali or alkaline earth metal rhodanide, especially so as to obtain a final purified product which is substantially free of thiourea. Another object of the invention is to achieve such a purified rhodanide in a process which substantially avoids the disadvantages of previously suggested processes. Yet another object of the invention is to provide a process for purifying these rhodanides wherein the thiourea content can be substantially reduced or completely removed in a relatively simple and economical manner. These and other objects of the invention will become more apparent upon consideration of the following detailed specification.

In accordance with the invention it has now been found that a very desirable removal of thiourea as an impurity from alkali and alkaline earth metal rhodanides can be achieved by a process which includes the step of heating an aqueous solution of the crude rhodanide containing the thiourea at a temperature of from about 80° C. up to the boiling point of the solution, this heat treatment taking place in the presence of copper (II) oxide. During this reaction, the thiourea is converted into urea and the copper (II) oxide is converted into the corresponding sulfide in accordance with the following equation:

In the process according to the invention, it is not necessary to exactly determine the content of thiourea by analytical methods before carrying out the treatment of the rhodanide solution, since the copper (II) oxide can and should normally be used in excess. Any unused copper (II) oxide is then filtered off together with the copper (II) sulfide resulting from the reaction. The filter residue, which consists of a mixture of copper (II) oxide and copper (II) sulfide, can be easily roasted or oxidized completely to the copper oxide and again used for carrying out the process of the invention. Thus, it is especially desirable to employ a relatively large excess of the copper (II) oxide in the process so as to be absolutely certain that all of the thiourea will be reacted.

The extent to which the content of thiourea can be removed depends not only upon the amount of the copper (II) oxide being employed but also depends upon the treatment temperature and the period of time over which the treatment is carried out. Moreover, a very substantial or complete removal of the thiourea depends in part upon the degree of fineness or dispersion of the added copper (II) oxide. Accordingly, it is especially preferred to employ a copper (II) oxide with a particle size in the range of about II up to LX microns.

When the reaction temperature is kept constant within the designated range, a greater amount of thiourea is converted into urea with larger amounts of the copper (II) oxide and/or longer periods of time for carrying out the treatment. Also, with the same treatment temperature and the same amounts of copper (II) oxide, the reaction proceeds more rapidly and more completely as the particle size of the added copper (II) oxide is reduced. For this reason, it is usually desirable to proceed by using a particle size of less than 80 microns and preferably less than 60 microns, the lower limit of about 2 microns being set for practical reasons.

It is also especially preferred to work at about the boiling temperature of the rhodanide solution containing the thiourea as an impurity. At lower temperatures, it is necessary in order to convert the same amount of thiourea into urea to employ either a much greater amount of copper (II) oxide or a much longer reaction time. Thus, the treatment can be carried out at temperatures below about 80° C., but in this case, the copper (II) oxide requirements are extremely high and the reaction period is quite long. Therefore, for practical reasons one should employ a temperature of at least about 70°–75° C. and preferably 80° C. or more.

In order to achieve a quantitative conversion of thiourea into urea, it is sufficient to provide a reaction period of about 1.5 hours when using a finely divided copper (II) oxide and a reaction temperature maintained at about the boiling temperature of the solution. By way of further example, when working with an initial crude sodium rhodanide solution containing 600 to 1,000 ppm thiourea (with reference to the rhodanide), it is desirable to employ about 400 percent by weight of the copper (II) oxide with reference to the thiourea. Correspondingly, where the initial crude sodium rhodanide solution contains 100 to 600 ppm thiourea (with reference to the rhodanide), it is desirable to employ about 600 percent by weight of copper (II) oxide with reference to the thiourea. When dealing with a 30 percent by weight solution of sodium rhodanide, these values for the amount of copper (II) oxide correspond to about 1.4 grams/liter of sodium rhodanide solution contaminated with 1,000 ppm thiourea and about 1 grams/liter of sodium rhodanide solution contaminated with 500 ppm thiourea. In other words, it is preferable to increase the percentage excess of copper (II) oxide as the initial content of the thiourea impurity decreases. In general, however, one can employ at least a stoichiometric amount of 100 percent by weight copper (II) oxide with reference to the thiourea impurity, but it is preferable to employ at least 200 percent by weight. A very large excess of the copper (II) oxide can be very safely used but may result in excessive costs in recovering the unused portion thereof.

Technical or crude solutions of alkali and alkaline earth metal rhodanides usually do not contain any ammonium rhodanide. However, according to the process of the present invention, even these solutions containing ammonium rhodanide as well as the alkali or alkaline earth metal rhodanide in solution can also be treated. In this case, the reaction mixture contains small amounts of copper rhodanide in dissolved form. The copper ions could be separated therefrom in a simple manner, for example by leading into the reaction mixture an amount of hydrogen sulfide sufficient to achieve a quantitative precipitation of the copper ions as copper (II) sulfide. The precipitated sulfide can then be filtered off. The resulting rhodanide-containing filtrate is then free of copper ions. This presence of ammonium rhodanide with the resulting formation of copper ions has no substantial effect upon the substantial removal of thiourea, and the reaction mixture can be very easily purified in terms of separating or removing the copper ions.

The process of the present invention can be applied to rhodanide solutions of widely different concentrations, including those of very small concentrations. If one begins with a solid, thiourea-containing alkali or alkaline earth metal rhodanide, it is especially recommended to produce an aqueous solution with the greatest possible concentration of the rhodanide and then proceed to treat this solution according to the invention. It may be most expedient, however, to simply use the aqueous solutions normally obtained in the technical production of alkali or alkaline earth metal rhodanides, these technical solutions usually containing about 30 to 50 percent by weight of the rhodanide. It will be understood, of course, that the aqueous solutions may contain mixtures of the various alkali and alkaline earth metal rhodanides.

In comparison to known processes, the process of the present invention has the considerable advantage that it is not necessary to determine exactly the thiourea content of the rhodanide solution being treated. It is further distinguished by the fact that the sulfur of the thiourea is not oxidized to the sulfate which can only be separated from the rhodanide solution in a very expensive manner, but instead is easily filtered off and recovered in the form of copper (II) sulfide. The time required to carry out the process of the invention is about half or even less than the time required in previously known processes. For this reason, the process of the present invention is much more easily carried out as a substantially continuous process.

The invention is further illustrated by but not limited to the following examples.

EXAMPLE 1

One liter of an aqueous 30 percent solution of sodium rhodanide contaminated with about 700 ppm of thiourea is heated to the boil and treated with 1 gram of copper (II) oxide while stirring and maintaining the boiling temperature for a period of 90 minutes. The mixture is then cooled and the resulting copper sulfide as well as excess copper oxide is filtered off. The filtrate is then evaporated with the sodium rhodanide being crystallized and recovered in a conventional manner. The recovered sodium rhodanide is free of thiourea.

EXAMPLE 2

The same procedure is followed as in Example 1, beginning with 1 liter of an aqueous 20 percent solution of calcium rhodanide which is contaminated with 300 ppm of thiourea. After bringing this solution to the boil, it is treated with 0.4 grams of copper (II) oxide while mixing at the boiling temperature for 90 minutes. Then, after cooling, the reaction mixture is worked up for removal of copper sulfide and oxide and recovery of the purified rhodanide product. The resulting calcium rhodanide is essentially free of thiourea.

Similar excellent results are achieved with other crude alkali metal or alkaline earth metal rhodanides over a wide range of concentrations in aqueous solution and with small or large amounts of thiourea, e.g. from a few parts per million up to 1,500 ppm, preferably in a range of about 100 to 1,000 ppm (all with reference to the particular rhodanide being treated). Also, as noted above, the presence of ammonium rhodanide in minor amounts has no adverse effect upon the removal of thiourea in accordance with the process of the invention.

In the foregoing examples and elsewhere in this application, it will be understood that "copper (II)" refers to copper with a valency of two, i.e., the cupric form. Also, it should be noted that the term "rhodanide" is synonymous with "thiocyanate."

In view of the relatively short time required to complete the treatment with copper (II) oxide, a continuous process can be carried out substantially as indicated in the examples but with a continuous flow of the solution being treated, preferably at the boiling temperature and if desired under a slightly elevated pressure. The copper sulfide may be continuously regenerated to copper oxide and returned with the excess copper oxide as a recycle stream. The finely divided oxide and sulfide are easily distributed or suspended in the solution being treated and can be continuously filtered off with conventional apparatus. The purification treatment can also be conducted continuously in two or more stages, and these and other variations of the process will be readily apparent to one skilled in this art.

The invention is hereby claimed as follows:

1. The process for removing thiourea as an impurity from a crude alkali- or alkaline earth-metal rhodanide which comprises heating an aqueous solution of said crude rhodanide containing said thiourea at a temperature of from at least about 70° C. up to the boiling point of the solution in the presence of at least a stoichiometric amount of copper (II) oxide so as to convert thiourea into urea and copper (II) oxide into copper (II) sulfide, and isolating the resulting rhodanide solution from the copper (II) sulfide and any remaining copper (II) oxide.

2. The process as claimed in claim 1 wherein said copper (II) oxide is employed in an amount of at least about 200 percent by weight with reference to said thiourea.

3. The process as claimed in claim 1 wherein said copper (II) oxide is present in an amount of at least 400 percent by weight with reference to said thiourea.

4. The process as claimed in claim 1 wherein said copper (II) oxide has a particle size of approximately 2 to 60 microns.

5. The process as claimed in claim 1 wherein said heating is carried out at from about 80° C. up to the boiling temperature of the solution being treated with copper (II) oxide.

6. The process as claimed in claim 1 wherein said solution is heated at approximately its boiling temperature.

7. The process as claimed in claim 6 wherein said copper (II) oxide has a particle size of approximately 2 to 60 microns.

8. The process as claimed in claim 1 wherein the solution is treated for a period of time sufficient to substantially completely convert the thiourea impurity into urea while also converting a stoichiometric amount of said copper (II) oxide into copper (II) sulfide.

9. The process as claimed in claim 8 wherein the completely reacted solution is filtered to separate and recover copper (II) sulfide as a solid residue together with any unreacted copper (II) oxide.

10. The process as claimed in claim 9 wherein said recovered copper (II) sulfide is oxidized back to copper (II) oxide for reuse in the treatment of the rhodanide.

* * * * *